Oct. 10, 1950 O. L. GIFFIN Re. 23,281

WIRE STRANDING DEVICE

Original Filed Feb. 6, 1947 3 Sheets-Sheet 1

WIRE STRANDING DEVICE

Original Filed Feb. 6, 1947 3 Sheets-Sheet 2

Inventor:
Otto L. Giffin
By
Chester A. Williams
Attorney

Oct. 10, 1950 O. L. GIFFIN Re. 23,281
WIRE STRANDING DEVICE
Original Filed Feb. 6, 1947 3 Sheets-Sheet 3
Fig. 7.
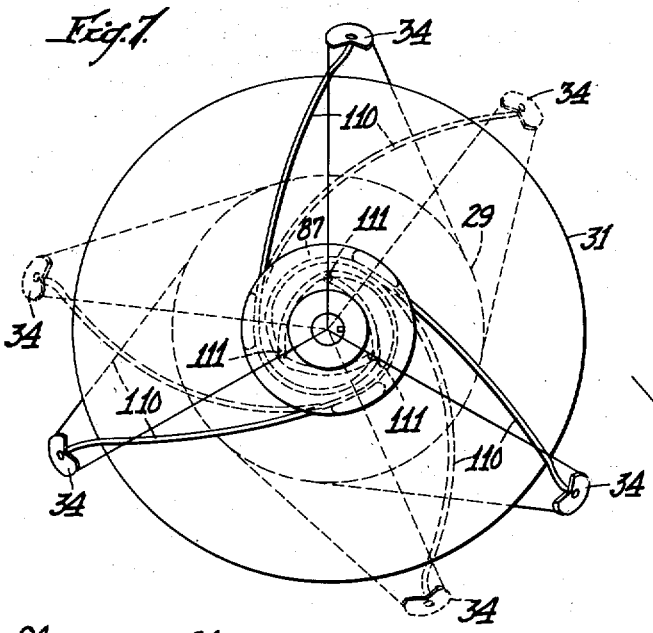
Fig. 8.
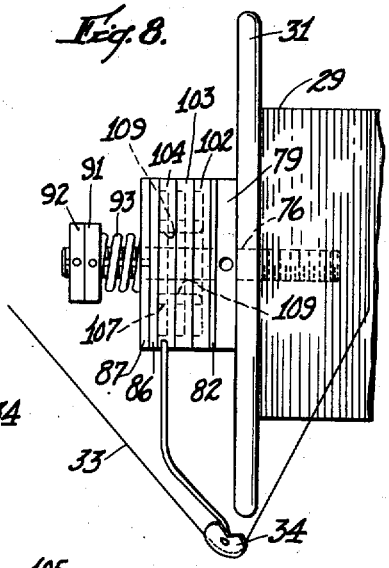
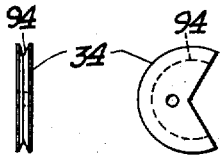
Fig. 10.
Fig. 9.
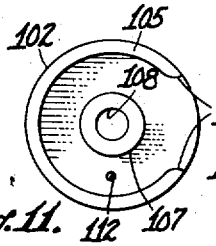
Fig. 11.
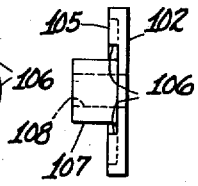
Fig. 12.
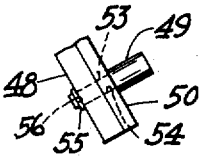
Fig. 15.
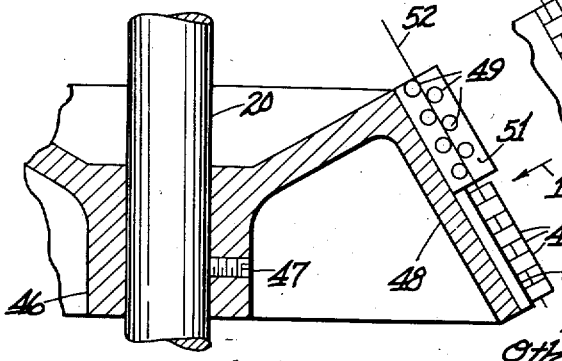
Fig. 13.
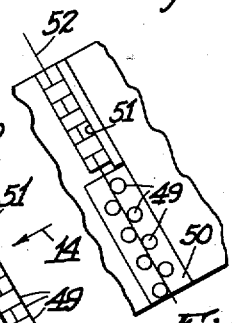
Fig. 14.
Inventor:
Otto L. Giffin
By
Chester A. Williams
Attorney Reissued Oct. 10, 1950

Re. 23,281

UNITED STATES PATENT OFFICE 23,281

WIRE STRANDING DEVICE

Otho L. Giffin, Worcester, Mass.

Original No. 2,484,282, dated October 11, 1949, Serial No. 726,915 filed February 6, 1947. Application for reissue filed June 28, 1950, Serial No. 170,825

5 Claims. (Cl. 57—64)

Matter enclosed in heavy brackets [ ] appears in the original patent but forms no part of this reissue specification; matter printed in italics indicates the additions made by reissue

The present invention relates to strand twisting apparatus and more particularly to an apparatus for twisting strands together to form a composite group.

*It is common practice to strand a group of wires by drawing the wires from spools and twisting them together in a stranding die and so forming a stranded product. Spools of that stranded product are made up and held in storage, and thereafter the stranded wires are subjected to a further stranding operation in a closing die whereby the smaller diameter strands are laid in a larger cable.*

*According to a primary purpose of this invention, these two separate operations are carried on continuously by means of a single machine, wherein groups of the individual small wires are fed from their spools and revolubly stranded or twisted together by means of associated stranding dies and the several stranded wires are fed directly and continuously with a core to a closing and stranding die where the strands are closed and wound in a reverse direction.*

*In the preferred construction, the stranding dies are revolved about the axis of the closing die for the final closing operation, and the groups of small sized wires fed to the stranding dies are revolved relative thereto in a peripheral direction which is opposite to that of the dies. This requires that each group of wires revolve in one direction relative to its associated die and that all of the spools, wires and stranding dies revolve in an opposite direction relative to the closing die. Also, the mechanisms are coordinated to maintain the association of the spools and their wires with the stranding dies as the latter revolve for the final closing operation.*

More specifically, the present invention relates to apparatus which is adapted to draw wire strands from a suitable package about which the strands have been laid together in parallel relation and then to lay the strands in helical fashion one about the other or the plurality about a core strand. Furthermore, such apparatus may be adapted for drawing a plurality of wire strands from each of a plurality of such packages and simultaneously twisting these strands from each package into separate cables and thereafter twisting these separate cables together to form a unitary cable, all in one continuous operation.

*However, a problem is presented in the requirement that each wire that is to be stranded shall be fed forward under a proper tension so that the cable will have a uniform structure*

*throughout. This is particularly serious where the several wires of a group to be stranded are wound on a single spool or in one package and are drawn forward simultaneously for an initial stranding operation, since it is necessary that the separate wires of the group be delivered from their package to the stranding die without there being an excessive amount of slack or a too severe tension in any one wire.*

[Although the above noted type of wire stranding apparatus is broadly old, such apparatus in the past has not been successfully used for so stranding all types of wire and particularly wires having small diameters. It has been found that the prior types of wire stranding apparatus were unsuccessful in handling such wire for the reason that no means were provided on the apparatus which would deliver the wire strands from the wire packages to the remainder of the device without introducing either an excessive amount of slack or tension in the various strands.]

It is therefore one of the primary [objections] *objects* of the present invention to provide such a wire stranding apparatus with means whereby the various wire strands may be delivered from the wire packages to the remainder of the apparatus without introducing in such strands excessive slack or tension.

Another object of the present invention is to provide an improved apparatus for twisting a plurality of wire strands into a unitary cable while maintaining the tensions within the wire strands substantially the same. With the above and other objects in view as will hereinafter appear, the invention comprises the devices, combinations and arrangements of parts hereinafter set forth and illustrated in the accompanying drawings of a preferred embodiment of the invention from which the several features of the invention and the advantages attained thereby will be readily understood by those skilled in the art.

Fig. 7 represents a top plan view of a third form of cap unit.

Fig. 8 represents a fragmentary side view of the cap unit which is disclosed in Fig. 7.

Fig. 9 represents a front elevation of a sector disc guide of the type used on each of the three forms of cap units.

Fig. 10 represents a side elevation view of the guide element disclosed in Fig. 9.

Fig. 11 represents a top plan view of one of the disc elements used in the cap device disclosed in Figs. 7 and 8.

Fig. 12 represents a side elevation view of the disc disclosed in Fig. 11.

Fig. 13 represents on an enlarged scale, a vertical sectional view of the wire-straightener unit disclosed in Fig. 1.

Fig. 14 represents a fragmentary side view of a portion of the wire-straightener device disclosed in Fig. 13.

Fig. 15 represents an enlarged fragmentary view of a portion of the wire-straightener disclosed in Fig. 14.

Figure 1:
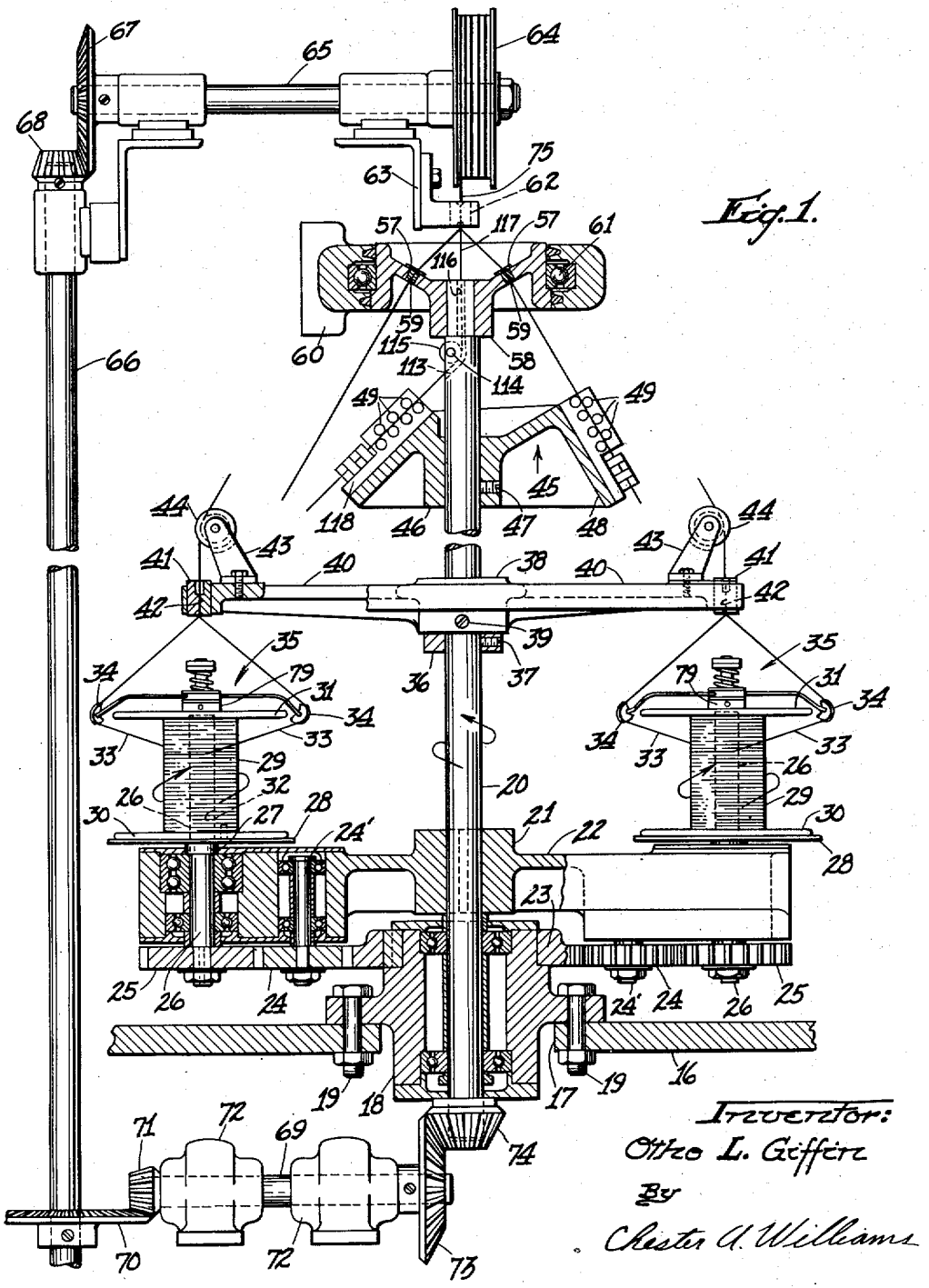
Fig. 1 represents a fragmentary side view, partly in section, of one form of a strand twisting apparatus embodying the features of the present invention.

Referring now to the drawings wherein only such portions of the apparatus have been shown which are essential to an understanding of the invention, and particularly to Fig. 1, a portion of the stationary frame of the apparatus is indicated at 16 and secured thereto within an opening 17 is a stationary collar 18. This collar 18 may be secured to the stationary member 16 by means of a plurality of bolts, 19, 19. Vertically journaled within the collar 18, in a suitable manner, is a rotatable flier shaft 20 upon which is rigidly carried a collar member 21 having a spider frame 22 carried about the periphery thereof. Mounted rigidly upon and about the upper portion of the stationary collar member 18 is a gear 23 which is adapted to mesh with a plurality of idler gears 24, 24 each of which is carried by a stub shaft 24' which is in turn rotatably journaled within the spider member 22. Meshing with each one of the idler gears 24, 24 is a spindle-driving gear 25 carried by the lower portion of each of a plurality of spindle shafts 26, 26 which are suitably journaled within the peripheral portion of the spider 22.

Still referring to Fig. 1, each of the spindles 26, 26 is formed intermediate its ends with a cylindrical collar portion 27 to which is rigidly secured a flat circular disc member 28. Each of the spindles 26, 26 is adapted to have removably mounted thereon a wire-containing package in the form of a spool 29 having the usual wire-confining discs 30 and 31. It is to be understood that each of the spools 29, 29 is formed with a longitudinal bore 32 therein so that each spool may be mounted directly upon a respective one of the spindles 26, 26 with the spindle disc 28 supporting the spool disc 30.

It will be readily apparent that any number of spools may be carried upon the flier spider 22 and that any number of strands may be wound about each of the spools 29, 29, but in Fig. 1, by way of example, there are illustrated two spools each of which has two wire strands 33, 33 wound thereon. Also it is to be understood that each spool 29, 29 will have mounted thereon a corresponding number of strand guides 34, 34 to the number of parallel strands which are on the supply package. The guides 34, 34 are carried by caps 35, 35 each of which is frictionally mounted upon a respective one of the spools 29, 29 and the details of construction of these caps will be hereinafter described.

Mounted intermediate the ends of the flier shaft 20 is a collar 36 which is secured thereto by means of a set screw 37. Mounted upon the top of the collar 36 and about the flier shaft 20 is a yoke member 38 which may be secured to the shaft 20 by means of a set screw 39. This yoke member 38 has a plurality of arms 40, 40 radiating therefrom and upon the peripheral portion of each of these arms is carried a strand guide element *or stranding die* 41, 41 having an axial bore 42 disposed therein for receiving and guiding the strands of wire which are delivered thereto from its associated wire package or spool 29. Also mounted upon each of the arms 40, 40 is a bracket 43 which is adapted to have rotatably mounted thereon an idler sheave 44 over which the wire strands are adapted to be trained. From the foregoing it is to be understood that the yoke member 38 may be shifted upwardly along the flier shaft 20 whenever it is necessary to remove or to replace any of the spools 29, 29. In order to so shift the yoke 38 it is merely necessary to loosen the set screw 39 and then elevate the yoke to a desired height along the shaft 20. It is also to be understood that the collar 36 functions as a stop for the yoke 38 to the end that the yoke may always be relocated in any one of a plurality of predetermined positions along the shaft 20 after the same has been so elevated.

Mounted upon the shaft 20 and above the yoke 38 is a wire-straightener member or killer 45 which functions to remove all of the kinks or twists from the wire strands after the strands leave the sheaves 44, 44 and before being delivered to the remaining portions of the stranding apparatus. This straightener 45 includes a collar 46 which is adjustably mounted upon the shaft 20 by means of a set screw 47, and thus the unit may be shifted vertically along the shaft 20 thereby to position the same in any desired location. More specifically, this wire-straightener element comprises an inverted substantially dished shaped casting and upon and about the peripheral side wall 48 thereof is mounted the usual wire-straightening rollers 49, 49.

Referring particularly to Figs. 1, 13, 14, and 15 it is to be understood that there are a plurality of wire-straightening stations disposed about the outer portion of the wall 48, the number of these stations corresponding to the number of wire packages provided in the present machine. Referring particularly to Figs. 13, 14, and 15, each one of these wire-straightening stations comprises a pair of roller-supporting platforms 50 and 51, the platform 50 being formed in a substantially flat relation with the outer portion of the wall 48 and the platform 51 being disposed upon the wall 48 and at right angles to the platform 50. Each one of the platforms 50 and 51 has mounted thereon a plurality of rollers 49, 49 which are distributed in the usual manner such that strands of wire 52 may be drawn therethrough so that the various rollers will function to remove any kinks or snarls occurring in the wire. The stations 50 and 51 being disposed at right angles to each other it is to be understood that the various rollers 49, 49 which are carried on these respective stations 50 and 51 will function to remove all malformations in the wire.

Referring particularly to Fig. 15, it will be understood that each of the rollers 49, 49 has a reduced end portion 53 which is journaled in an aperture 54 provided in its associated base portion. A snap ring 55 is mounted within a groove 56 provided in the distal end of the roller 49 thereby to prevent the same from moving endwise within the aperture 54. Thus, each one of the rollers 49, 49 may rotate about its longitudinal axis in response to the movement of the wire 52.

From the various wire-straightening stations the *stranded* wires are led directly to wire guides 57, 57 which are provided about the peripheral portion of a wire-guide head 58 secured to the upper end of the shaft 20 in any suitable manner such as that its head will rotate in synchronism with the shaft. Each of the guides 57, 57 is provided with the usual longitudinal bore 59 through which the various *stranded* wires are directed. Since this head 58 is spaced a substantial distance from the stationary frame member 16 the present invention contemplates the use of a guide member 60 which carries a usual type of ball bearing unit 61 which functions as an anti-friction means thereby properly to support the head without retarding the movement thereof. Although not disclosed in the present drawings, the member 60 is adapted to be rigidly secured to the base portion of the machine 16. Thus, the support 60 will prevent any whip from being introduced into the extreme upper portion of the rotatable shaft 20.

After leaving the guide members 57, 57, the various wires are adapted to be all directed through a guide *or closing die* 62 carried by a stationary bracket 63 after which the wires will be trained over a capstan head 64 carried up one end of a shaft 65. The other end of shaft 65 is connected to a vertically disposed shaft 66 by means of intermeshing gears 67 and 68. This shaft 66 is in turn connected to a drive shaft 69 by means of intermeshing gears 70 and 71. An electric motor 72, or other suitable driving means, is connected to the shaft 69 for positively driving the same to the end that the capstan head 64 is rotated at a constant predetermined speed. The shaft 69 is also interconnected with the flier shaft 20 by means of gears 73 and 74. From this it will be understood that in the present apparatus there is a definite predetermined ratio between the movements of the shaft 20 and those of the capstan head 64.

In the operation of the present apparatus, the flier comprising the rotatable shaft 20, the spider 22, and the yoke arms 40, 40 are rotated by means of the driving motor 72 in a clockwise direction as viewed in top plan. Since the gear 23 remains stationary at all times, the idler gears 24, 24 will not only be rotated about the axis of the shaft 20 but also each of them will rotate in a clockwise direction about the axis of its own shaft 24' in a clockwise direction as viewed in top plan to the end that each will ultimately drive its associated spindle gear 25 in a counter-clockwise direction about its shaft 26 while at the same time the entire spool assembly will be rotated about the axis of the shaft 20 and in synchronism with said shaft. From this it will be understood that each of the spools 29, 29 will be rotated about the axis of the shaft 20 in a clockwise direction but at the same time each will rotate about the axis of its associated spindle 26 in a counter-clockwise direction.

As is understood by those skilled in the art, each of the spools 29, 29 is rotated about the axis of its spindle shaft 26 in a direction such as to unwind the wire strands 33, 33 from the spool, and the guide members 34, 34 being frictionally mounted upon each of the spindles [29, 29] *26, 26* will move relative to the spool 29 thereby to give up wire from the spools and at the same time to lay the strands 33, 33 in helical fashion one about the other; it being understood that the differential of the number of turns of the spool and the guides will represent the number of twists or helical turns put into the strands one about the other. Also, since there is a definite relation between the rotation of the capstan head 64 and the rotation of the spools 29, 29 there will be produced a definite number of twists or lays of one of these [strands] *wires* about the other. From this it is clear that the wires 33, 33 are twisted one about the other *at the stranding die 41* between the wire guides 34, 34 and the sheave or pulley 44. Thereafter, each of the twisted pairs of wires will leave the sheaves 44 and be delivered through the wire-straightening devices and to the guide member 57, 57. After leaving the guides 57, 57, and before entering the stationary guide *or closing die* 62, the various [pairs of] *strands or* twisted wires will be laid one about the other for the reason that the entire flier unit is rotated about the axis of the shaft 20. Thus, a unitary twisted cable 75 will be formed before the wires engage the capstan head 64.

*As shown in the drawings, the revolving wires form a surface of revolution of a cone having a wide angled apex at the entrance to each die, and the spaced wires contact one another initially at that die entrance where their directions of longitudinal movement change abruptly as the wires are twisted about one another under tension and the helical arrangement of the twisted wires is set by the die. The apex angle of the cone at the die 41 is varied by adjusting the position of the yoke 38 on the central shaft 20, as above explained.*

From the above it may be understood that cables of various lays may be produced by varying the speeds of the spools 29, 29 relative to the speed of the shaft 20 and also by varying the ratio of movement between the capstan head 64 and the shaft 20. Such adjustments are well known in the art and further discussion of this phase of the present apparatus is not necessary.

Figure 2:
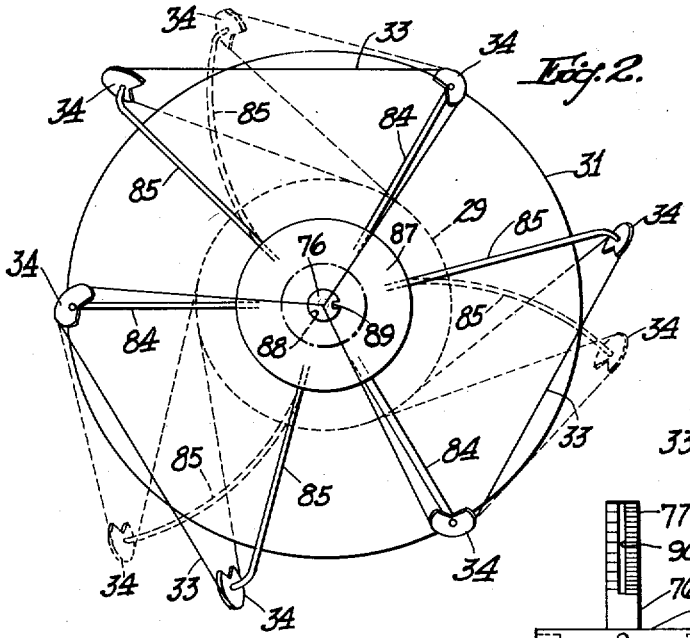
Fig. 2 represents, on an enlarged scale, a top plan view of one form of cap which is adapted to be secured to a wire strand package.
Figure 3:
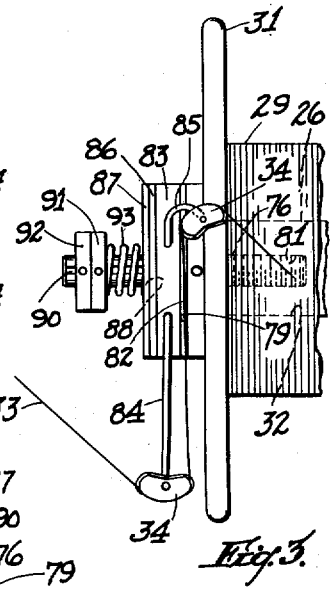
Fig. 3 represents a fragmentary side view of the device disclosed in Fig. 2.
Figure 4:
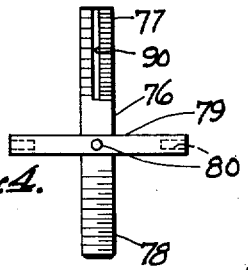
Fig. 4 represents a stud element used in the device disclosed in Figs. 2 and 3.

In order properly to control the [strands of wire] *wires* as the same are delivered from the various spools 29, 29 to the remaining portions of the apparatus, the present invention contemplates the provision of a novel guide and tensioning device which is adapted to be used in conjunction with each of the spools 29, 29. Referring particularly to Figs. 1, 2, 3, and 4, one form of the present device comprises a stud member 76 the opposite end portions 77 and 78 of which are threaded. Intermediate the end portions of the stud 76 is formed a circular disc member 79 the peripheral portion of which is provided with a plurality of circumferentially spaced apertures 80, 80. Referring particularly to Fig. 3, it is to be understood that the stud 76 has its threaded portion 78 received within a threaded aperture 81 provided in the end portion of the spindle 26. By inserting a spanner tool into the various apertures 80, 80 of the disc 79 the stud may be tightened within the spindle 26 so that the disc 79 may function to lock the spool 29 to the spindle shaft 26 and thus these latter two elements will rotate in synchronism.

Mounted upon the disc 79 is a fiber friction washer 82 upon which in turn is mounted an apertured disc 83 which is freely rotatable about the center portion of the stud 76. There are provided about the periphery of the disc 83 a plurality of radially disposed guide arms 84, 84 upon the end portions of each of which is mounted a sector disc guide 34. Each of the guide arms 84, 84 is formed as a substantially rigid member and positioned between these guides are disposed secondary guide arms 85, 85 which are also secured to the peripheral portion of the disc 79. Each of these secondary guide arms 85, 85 is formed of flexible wire so that the same may be readily deflected from its normal position. Also provided at the end portion of each of these secondary guide arms 85, 85 is a sector disc guide 34 and from Fig. 3 it is to be understood that the free end portion of each of the arms 85, 85 is bent downwardly so as to guide the wires 33, 33 about the spool disc 31. From this it is to be understood that the arms 84, 84 and 85, 85 are all carried by the disc member [76] *83* thereby to form a unitary element. Mounted upon the top portion of the disc 83 is a second fiber friction washer 86 upon the top portion of which is disposed a washer 87 having an aperture 88 which receives the stud 76. Referring particularly to Fig. 2, projecting inwardly from the washer 87 is a key 89 which is received within a longitudinal groove 90 formed in the top portion of the stud 76 thereby to prevent the washer 87 from turning about the axis of the stud. A nut 91 and a check nut 92 are threaded about the upper portion of the stud 76 and between the nut 91 and the disc 87 is disposed a coil spring 93 which surrounds the middle portion of the stud and functions to bias the disc 83 between the two fiber friction washers 82 and 86.

From the above it will be understood that any rotation of the spool 29 will tend to carry the disc 83, with its associated guide arms, therewith, but that relative movement between the spool and the disc 83 is permitted. By adjusting the nuts 91 and 92 longitudinally of the stud 76 the friction force between the disc 83 and the fiber friction washers 82 and 86 may be varied to the end that a greater or lesser force will be required to move the disc 83 relative to the spool 29. The number of guide arms 84, 84 about the periphery of the disc 83 will correspond to the number of strands of wire which are wound about the spool 29. In other words, wire-carrying packages or spools such as are used with the present type of apparatus are provided with any required number of wire strands mounted thereabout and, therefore, the present wire guiding and tensioning unit may be provided with a number of guide arms 84, 84 which correspond to the number of wire strands required for a particular operation.

In the operation of the present device each spool 29 has three *wires* [strands] and each of these *wires* [wire strands] 33, 33 is led from the spool 29 directly to a grooved sector disc guide 34 carrried on one of [a] *the* secondary guide arms 85 and from this point the wire is directed about a second sector disc guide which is carried upon one of the guide arms 84 and thereafter all of the *wires* [strands] are led directly to the guide means 41 *or stranding die* carried by one of the yoke arms 40. As each of the sector disc guides 34, 34 is provided with a groove 94 about the periphery thereof, it is to be understood that the wires 33, 33 will be properly guided from the periphery of the wire spool 29 to the wire guide 41 without any tendency for the wires to become unstranded. From the above it is clear that when the device is placed in operation and the capstan 64 draws the various [strands of wire] *wires* through the mechanism, each of the [wire strands] *wires* will be placed under tension to the end that each of the secondary guide arms 85, 85 will be biased in a clockwise direction towards its associated guide arm 84. In other words, each of the secondary guide arms 85, 85 is so designed that the normal tension which occurs in each of the *wires* [wire strands] 33, 33 is sufficient to deflect the arm out of its normal position. Therefore, whenever one of the *wires* [wire strands] 33 falls or jumps from its usual position on the spool 29, thereby providing an unusual amount of slack wire, it will be understood that its associated guide arm 85 will function immediately to take up this slack by moving towards its normal position due to the fact that the tension within such wire will have been reduced. Thus, the present guiding device functions to place each one of the *wires* [wire strands] under continuous tension thereby to exert a proper and continuous control over each of the several *wires* [strands] as the same are delivered through the wire stranding apparatus. As hereinabove noted, the entire cap or guide assembly 35 is adapted to move relative to the spool 29 to the end that the *wires* [wire strands] 33, 33 are laid one over the other. Therefore, by adjusting the nuts 91 and 92 longitudinally of the stud 76 it will be clear that a greater or lesser force will be required to so shift the guide unit 35 relative to the spool. Thus, by shifting the nuts 91 and 92 the tension within the *wires* [wire strands] 33, 33 may be properly adjusted to suit the various requirements of a particular job. In this connection, the design of the present guiding and tensioning unit is particularly advantageous for the reason that the adjustment of the nuts 91 and 92 need not be disturbed whenever the spool 29 is removed from and replaced upon the stranding apparatus for the reason that only the disc 79 need be turned in order to effect the removal and replacement of the unit.

Figure 5:
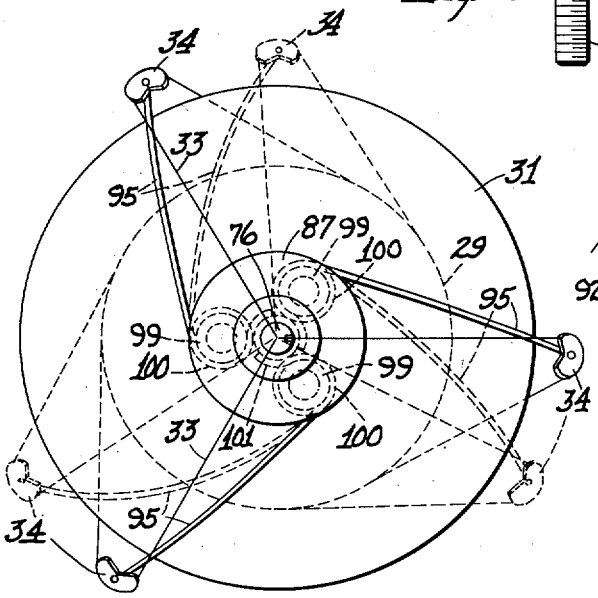
Fig. 5 represents a top plan view of a second form of cap unit.
Figure 6:
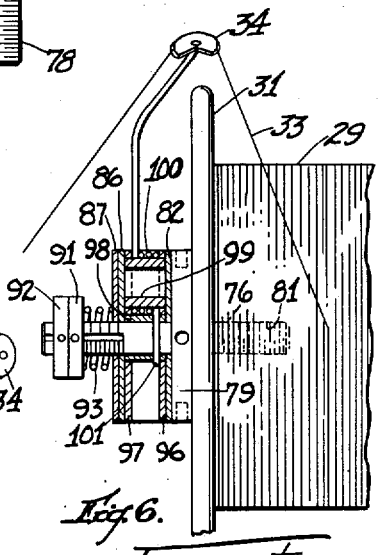
Fig. 6 represents a fragmentary side view of the cap unit disclosed in Fig. 5.

Referring to Figs. 5 and 6, there is disclosed a second form of strand guiding and tensioning means. This second form of the guiding and tensioning device utilizes substantially the same type of stud member 76 as is used with the hereinabove described first form and this stud unit with its disc 79 is adapted to be secured to the spindle [29] *26* in the manner as hereinabove described in connection with the first form of the device. This second form differs from the first form primarily in that the former utilizes no secondary guide arms and has provided thereon in lieu of these secondary guide arms three flexible guides 95, 95 which function to accomplish substantially the same degree of control over the wire strands as do the secondary arms 85, 85 of the first device. More specifically, in lieu of the disc 83, the present device has mounted between the fiber friction washers 82 and 86 a pair of vertically spaced disc members 96 and 97 secured together at their center portions by means of a hollow cylindrical hub 98 which is slidably mounted upon the middle portion of the stud 76. Circumferentially spaced between the discs 96 and 97 are three cylindrical sleeve members 95, 99, the end portions of which are each adapted to be rigidly secured to a respective one of the discs. Surrounding each one of the sleeves 99, 99 is a coil spring 100 one end of which is adapted to be partially coiled about the stud 76 as at 101. The outer end of each of the springs 100, 100, projects outwardly from the sleeve 99 thereby to form the gently curved guide arm 95. Referring particularly to Fig. 6, the free end portion of each of the arms 95, 95 is bent downwardly and has secured thereon a sector disc guide 34. By thus bending the end portion of each of the arms 95 downwardly it will permit the *wires* [wire strands] to be led directly to the sector disc guides without any interference from the top disc 31 of the spool 29.

With reference to Fig. 5, it is to be understood that by forming each of the arms 95, 95 in a curve, a wire [strand] may exert a turning movement about a sleeve 99 thereby to flex the arm about the sleeve member 99 so as to place each of the arms 95 under a substantially constant tension during the operation of the stranding machine. Each of the arms 95 is formed of spring wire material so that the normal wire tension will flex each arm to the dotted position, as disclosed in Fig. 5, whenever the stranding machine is operative. Therefore, whenever the machine is operative each of the arms 95, 95 will be biased into the dotted position shown in Fig. 5 to the end that these arms will act as take-up devices in the event that an unprecedented amount of slack occurs within any one of the *wires* [wire strands]. In other words, if one of the *wires* [wire strands] should fall out of position on the spool 29 during the wire stranding operation, the arm 95, over which such wire [strand] is trained, will move toward its normal position thereby immediately to take up any and all of the slack occurring in the wire.

A third form of wire guiding and tensioning device is disclosed in Figs. 7, 8, 11 and 12. This third device is substantially like the hereinabove noted second form in that both of these devices utilize single flexible wire guiding and tensioning arms. However, this third form differs primarily from the second form in that the former is provided with a different type of anchoring means for each of the guide arms.

More specifically, in the present third form of the device there is mounted about the stud 76 and between the fiber friction washers 82 and 86 three dish-shaped discs bearing the numbers 102, 103, and 104, respectively. Referring particularly to Figs. 11 and 12, the disc 102 is provided about the periphery thereof with an upstanding wall portion 105 a section of which is slotted as at 106. Formed centrally of the disc 102 is a cylindrical hub 107 having a bore 108 which is adapted to receive the stud 76. Each of the other discs 103 and 104 is formed like disc 102 with the exception that neither of the former has a hub 107 and in lieu thereof each of these discs is formed with an aperture 109. Referring particularly to Fig. 8, it is to be understood that the discs 103 and 104 are adapted to be suitably secured to and stacked upon the lower disc 102 so as to form one integral unit. Furthermore, by referring to Fig. 7, it will be apparent that the discs are so disposed relative to each other that the slots 106, 106 thereof are positioned symmetrically out of phase.

Each of the discs 102, 103, and 104 has coiled therein an end portion of a guide arm 110, which end portion is adapted to be coiled spring-fashion within the disc and to be rigidly secured therein by having its end portion 111 bent downwardly thereby to be received within an aperture 112 formed within the inner portion of the disc member. Referring to Fig. 7, it is to be understood that the other end portion of each of the arms 110, 110 projects out of its associated disc through the slot 106 thereby to form a wire guide arm having a sector disc guide 34 formed on the free end portion thereof. As in the case of the second form of the present invention, each of the arms 110, 110 is bent downwardly thereby to prevent the *wires* [wire strands] from engaging the disc 31 of the spool member 29. Also, each one of the arms 110, 110 is bent into a gentle curve thereby to enable its associated wire [strand] to exert a turning movement about the inner end of the arm to the end that the arm may be readily biased into the position shown by the dotted lines of Fig. 7. Each of the arms 110, 110 is made flexible to the end that the normal tension which is exerted upon each of the *wires* [wire strands] is sufficient to bias each of the arms into the dotted position, shown in Fig. 7, so that this third form of the present invention will function in substantially the same manner as the hereinabove described second form to the end that a proper take-up-action will be provided for each of the *wires* [wire strands] in the event that an excess amount of slack occurs therein. It is to be understood that each of the slots 106, 106 which is provided within the discs 102, 103, and 104 are made of sufficient length to enable each of the arms 110, 110 to flex through a substantially large predetermined arc.

Each of the three hereinabove described guiding and tensioning units functions in a similar manner in that each is effective to place each of the *wires* [wire strands] which is drawn from the spools 29, 29 under a substantially constant tension throughout the entire wire stranding process. Also, each of these devices functions as a wire take-up unit so that in the event that an unprecedented amount of slack occurs in any one of the wires these devices would be immediately effective to remove said slack automatically thereby to prevent the wire from fouling the wire stranding mechanism. In this connection it is to be understood that each of these units may be provided with any reasonable number of guide arms thereby to adapt the same for use with wire-containing spools having any predetermined number of *wires* [wire strands] wound thereon. Furthermore, it should be apparent that the present guiding and tensioning units may not only be advantageously used in conjunction with wire stranding machines of the above described type, but that they can be readily used on that type of machine which comprises a single wire-containing spool which is merely rotated about its longitudinal axis and is not mounted upon a rotating flier.

In the event that it is desired to lay the wire strands in helical fashion about a central core the present machine is provided with means to accomplish this objective. Referring to Fig. 1, the upper portion of the flier shaft 20 is provided with a slot 113 in which is mounted a pin 114 upon which is rotatably carried a pulley 115. Communicating with the slot 113 is an axial bore 116 formed in the upper end portion of the shaft 20. Thus, a group of wire strands 117 may be trained about the pulley 115 and thereafter directed through the bore 116 and through the guide 62 to the capstan head 64. From this it will be apparent that the other wire groups, which are directed towards the guide *or closing die* 62 in a cone-shaped pattern, will be wound about the core wires 117 in a helical fashion.

In order so to deliver the wires 117 to the pulley 115 the wire-straightener head 45 is provided with a special wire-straightener station 118 which is disposed at an angle such that it is adapted to receive strands of wire directly from any one of the sheaves 44 and thereafter to deliver the same directly to the pulley 115.

*This machine serves to strand individual wires supplied by the spools 29 by revolving the wires of each group relative to the stranding die 41 and thus causing these wires to be twisted together and form what is herein termed a stranded wire. The capstan 64 about which the final stranded wire product is wrapped draws each of the wires forward from its associated spool and through the stranding dies and the final closing die 62. Each spool is positively rotated by its supporting table or disc member 28, but the wire guide arms 84, 85 are frictionally driven with the spool and can rotatively slip relative thereto as required by the pull of the capstan 64 on the stranded wire. That is, the disc 83 carrying the guide arms is turned against the friction pressure of spring 93 to unwrap the wires from the spool as the capstan pulls it off. If the tension in any one of the three wires coming off the spool varies, compensation is made by means of the spring arms 85 and equivalent parts as above described. Hence, the individual wires that are being stranded in the dies 41 are drawn forward under the uniform tension provided by the arms 85. These spools are all being rotated relative to the spider frame 22 in a counter-clockwise direction so that the lay of the group of wires in each stranding die 41 is counter-clockwise.*

*The closing die is stationary, and it is required that all of the stranded wires be rotated in the opposite peripheral direction so as to lay the strands clockwise about one another and the core 117 that is fed into the middle of the assemblage of stranded wires. To effect this second operation of stranding and closing the stranded wires and have the lay of the wires in each strand opposite to the lay of the strands in the final product, it is therefore necessary that the guides 57 revolve in a clockwise direction. But each of the groups of wires being stranded at the several dies 41 must remain in their correct relationship. Hence the dies 41 and the associated guides 57 are revolved clockwise, and the spider 22 carrying the individual spools or packages of wire is also revolved in that same clockwise direction and at the same angular rate as the guides 41 and 57 move. Consequently in this machine, the wires carried on the spools are being stranded by means of revolving stranding dies 41, and the spools and their associated stranding dies are revolved in an opposite direction relative to the closing die 62 to form the final product made up of the stranded wires twisted about the central core.*

I claim:

1. In a strand-twisting apparatus, the combination of a spindle, means for rotating said spindle, a strand package mounted upon said spindle for rotation therewith and having a plurality of strands wound thereabout, a strand-guiding head including a central hub disposed coaxially of said spindle, said hub being frictionally supported upon said spindle, an even number of strand guide elements circumferentially spaced about said hub, means for rigidly securing one half of said strand guide elements to said hub, and means for flexibly securing the other half of said strand guide elements to said hub, each of said strands passing successively through one of said flexibly mounted strand guide elements and a respective one of said rigidly mounted strand guide elements.

2. In a strand-twisting apparatus, the combination of a spindle, means for rotating said spindle, a strand package mounted upon said spindle for rotation therewith and having a plurality of strands wound thereabout, a support member removably secured upon said spindle for rotation therewith, a strand-guiding head including a central hub frictionally mounted upon said support member, means for adjusting the friction force between said support member and said hub, a plurality of alternately spaced rigid and flexible arms projecting outwardly from the periphery of said hub, and a strand guide carried at the outer end portion of each of said arms, each of said strands passing successively through a respective one of said flexibly mounted strand guides and a respective one of said rigidly mounted strand guides.

3. In a strand-twisting apparatus, having a plurality of rotatable elements, a strand package having a plurality of strands wound thereabout and carried by each of said rotatable elements, means for rotating said elements to twist together the strands from each strand package into individual groups, means for causing the several groups of strands to travel towards each other, and means for twisting said several groups of strands together to form a single group; the improvement which consists in the provision of a strand-guiding head frictionally carried by each of said rotatable elements for engaging each of the strands carried by a respective one of said strand packages thereby to apply a substantially constant tension upon each of said strands and to remove any and all slack occurring in any of said strands, said strand-guiding head including a central hub having a plurality of strand guides flexibly mounted thereon.

*4. A machine for stranding wires and closing the strands continuously and completing the cable in a single operation comprising a closing die for a group of wire strands, a set of dies for stranding groups of individual wires, a support for the stranding dies mounted to revolve about the closing die axis, a set of rotatable spools having wire mounted thereon, spaced wire guides which deliver groups of individual spool wires to each stranding die, a revoluble support for the spools and associated guides which maintains them in operative association with the revolving stranding dies, spaced revoluble guides which deliver the stranded wires to the closing die, mechanism for revolving the stranding dies, the stranded wires and their associated revoluble guides in one peripheral direction and concentrically about the closing die axis for closing the strands, means for revolving the group of spool wires and guides associated with each stranding die in a peripheral direction opposed to that of the movement of the stranding dies so that the lay of the wires in a strand will be the reverse of the lay of the strands in the final product, a power driven capstan engaging the final product and drawing all the wires from their associated spools and through their respective dies, and means for frictionally tensioning the wire drawn from the spools, said guides being so spaced relative to their associated dies that the revolving wires form*

*cones of revolution apexing at the dies where the direction of travel of each wire changes abruptly and the wires to be stranded contact initially and are twisted together in a helical formation.*

*5. A machine according to claim 4 in which several wires are mounted on each spool and comprising a wire tensioning and guiding head mounted for frictional rotation relative to each spool and having a plurality of wire guides flexibly and resiliently carried thereon, each guide engaging and resiliently tensioning a single wire and the head being rotated relative to the spool as the wire is drawn forward by the capstan.*

OTHO L. GIFFIN.

REFERENCES CITED

The following references are of record in the file of this patent:

UNITED STATES PATENTS

| Number | Name | Date |
|---|---|---|
| 306,911 | Fornander | Oct. 21, 1884 |
| 787,717 | Bates | Apr. 18, 1905 |
| 2,034,268 | Nydegger | Mar. 17, 1936 |
| 2,130,394 | Klein | Sept. 20, 1938 |
| 2,353,100 | Winslow | July 4, 1944 |

FOREIGN PATENTS

| Number | Country | Date |
|---|---|---|
| 41,597 | France (Addition to No. 733,756) | Dec. 13, 1932 |
| 387,430 | Great Britain | Feb. 9, 1933 |
| 435,168 | France | Dec. 18, 1911 |